(12) United States Patent
Fröhlich et al.

(10) Patent No.: US 11,942,745 B2
(45) Date of Patent: Mar. 26, 2024

(54) CRIMPING MACHINE

(71) Applicant: ZOLLER & FRÖHLICH GMBH, Wangen im Allgäu (DE)

(72) Inventors: Christoph Fröhlich, Wangen (DE); Hans Leupolz, Argenbühl (DE); Steffen Hartinger, Wangen (DE); Michael Mennig, Bad Wurzach (DE); Richard Buchner, Leutkirch (DE)

(73) Assignee: ZOLLER & FRÖHLICH GMBH, Wangen Im Allgäu (DE)

( * ) Notice: Subject to any disclaimer, the term of this patent is extended or adjusted under 35 U.S.C. 154(b) by 48 days.

(21) Appl. No.: 17/056,118

(22) PCT Filed: May 16, 2019

(86) PCT No.: PCT/EP2019/062742
§ 371 (c)(1),
(2) Date: Nov. 17, 2020

(87) PCT Pub. No.: WO2019/219880
PCT Pub. Date: Nov. 21, 2019

(65) Prior Publication Data
US 2021/0210918 A1 Jul. 8, 2021

(30) Foreign Application Priority Data

May 18, 2018 (DE) ...................... 10 2018 112 112.1
Jul. 5, 2018 (DE) ...................... 10 2018 116 342.8

(51) Int. Cl.
*H01R 43/055* (2006.01)
*B65G 47/14* (2006.01)
(Continued)

(52) U.S. Cl.
CPC ....... *H01R 43/055* (2013.01); *B65G 47/1421* (2013.01); *H01R 43/048* (2013.01); *H01R 43/0484* (2013.01); *H01R 43/052* (2013.01)

(58) Field of Classification Search
CPC .............. H01R 43/048; H01R 43/0484; H01R 43/055; B65G 47/1421
See application file for complete search history.

(56) References Cited

U.S. PATENT DOCUMENTS 3,568,229 A * 3/1971 Steadman .......... B65G 47/1421
470/58
3,654,650 A * 4/1972 Burgess, Jr. ............ B23P 19/08
470/46
(Continued)

FOREIGN PATENT DOCUMENTS

CN 104953439 A * 9/2015
CN 105620818 A * 6/2016
(Continued)

OTHER PUBLICATIONS

Chinese Notification of First Office Action dated Oct. 12, 2021 re Application No. 201980030177.7 (original with English translation) (4 pages).
(Continued)

*Primary Examiner* — Jeffrey T Carley
(74) *Attorney, Agent, or Firm* — Mindful IP Law PLLC; Michael J. McCandlish

(57) ABSTRACT

A crimping machine includes a storage arrangement having a plurality of feeding bowls for separated contact elements. The crimping machine further includes a device for transporting the contact elements to a crimp head. At least some of the feeding bowls are designed with a common vibration driver and can be driven via a common control unit.

13 Claims, 5 Drawing Sheets

(51) Int. Cl.
H01R 43/048 (2006.01)
H01R 43/052 (2006.01)

(56) References Cited

U.S. PATENT DOCUMENTS

| | | | | |
|---|---|---|---|---|
| 3,664,173 A | * | 5/1972 | Haucke | H01R 43/055 |
| | | | | 29/818 |
| 3,709,378 A | | 1/1973 | Segal | |
| 4,236,302 A | * | 12/1980 | Kuehling | H01R 43/04 |
| | | | | 221/160 |
| 4,348,806 A | * | 9/1982 | Eves | H01R 43/04 |
| | | | | 72/424 |
| 4,443,936 A | | 4/1984 | Lazaro, Jr. | |
| 4,835,855 A | * | 6/1989 | Eaton | H01R 43/04 |
| | | | | 29/748 |
| 5,125,154 A | * | 6/1992 | Cross | H01R 43/28 |
| | | | | 29/748 |
| 5,153,839 A | * | 10/1992 | Cross | G05B 19/41835 |
| | | | | 29/33 M |
| 5,511,307 A | * | 4/1996 | Reiersgaard | H01R 43/04 |
| | | | | 29/748 |
| 5,930,891 A | * | 8/1999 | Loving, Sr. | H01R 43/052 |
| | | | | 29/863 |

FOREIGN PATENT DOCUMENTS

| | | | | |
|---|---|---|---|---|
| CN | 107394557 A | * | 11/2017 | H01R 43/055 |
| CN | 107394557 A | | 11/2017 | |
| CN | 105703195 B | | 12/2017 | |
| DE | G 93 08 266.5 | | 9/1993 | |
| DE | 43 26 530 A1 | | 10/1994 | |
| DE | 44 40 835 C1 | | 8/1996 | |
| DE | 197 14 964 C1 | | 7/1998 | |
| DE | 198 31 588 A1 | | 9/1999 | |
| DE | 10 2004 057 818 B3 | | 8/2006 | |
| DE | 2015 102 060 A1 | | 8/2016 | |
| DE | 10 2015 119 217 A1 | | 5/2017 | |
| DE | 10 2017 118 968 A1 | | 2/2019 | |
| EP | 0036240 A1 | * | 9/1981 | H01R 43/04 |
| EP | 0036240 B1 | | 1/1985 | |
| JP | S5285383 A | | 7/1977 | |
| JP | S60-161 812 A | | 8/1985 | |

OTHER PUBLICATIONS

Search Report for German Application No. DE102018116342.8 dated Mar. 22, 2019.
Kreith, Frank and Goswami, Yogi: "The CRC Handbook of Mechanical Engineering" CRC Press, Chapter 14 pp. 76-80.
International Preliminary Report on Patentability for International Application No. PCT/EP2019/062742 dated Nov. 24, 2020.
International Application No. PCT/EP2019/062742, International Search Report dated Aug. 23, 2019, 5 pages.
International Application No. PCT/EP2019/062742, Written Opinion dated Aug. 23, 2019, 9 pages.
Notice of Allowance issued in correlated JP Patent Application No. 2020-564582 dated Apr. 4, 2023.

* cited by examiner

CRIMPING MACHINE

CROSS-REFERENCE TO RELATED APPLICATIONS

This application is a national stage of, and claims priority to, Patent Cooperation Treaty Application No. PCT/EP2019/062742, filed on May 16, 2019, which application claims priority to German Application No. DE 10 2018 112 112.1, filed on May 18, 2018 and German Application No. DE 10 2018 116 342.8 filed on Jul. 5, 2018, which applications are hereby incorporated herein by reference in their entireties.

INTRODUCTION

The disclosure relates to a crimping machine according to the preamble of the independent claim.

Such a crimping machine is known, for example, from the patent specification DE 44 40 835 C1 of the Applicant and serves to crimp ferrules with a stripped cable end. In the known solution, these ferrules are rolled up as a belt strap on a drum magazine and are conveyed from there to a crimp head via a transport unit. Alternatively, the ferrules or contact elements can also be stored individually in a storage unit and then be conveyed in a defined position to the crimp head via a suitable feeding device. Such a feeding device is described, for example, in DE 198 31 588 A1.

In the known solutions, the ferrule to be crimped is placed on the stripped cable end with a holding unit and then crimped by the crimp head. The cable end can be stripped either externally or via a stripping head integrated in the crimping machine.

The structure of a transport unit for conveying the ferrules or other electrical components arranged on a belt strap is described in the Applicant's publication G 93 08 266.5, for example. A similar transport unit is also disclosed in DE 197 14 964 C1.

In series production, it is necessary to crimp different cable cross-sections and electrical components/contact elements together and then install them in a subsequent assembly step, for example when assembling a switch cabinet. There are several options for this: in one variant the crimping machine is converted to crimp different cable cross sections and/or contact elements (ferrules), or several crimping machines are provided to process the different cable cross sections/contact elements.

The first solution requires high set-up times and a considerable amount of personnel. A further disadvantage is the risk of inserting the wrong cable cross-section, which increases the reject rate. With the latter solution, this disadvantage is overcome with a large number of crimping machines—however, the investment costs are considerable.

In the publication DE 10 2004 057 818 B3, a machine (designed as a stripper, crimper) is disclosed with which different cable cross sections and ferrules can be processed. One respective drum magazine is provided for different ferrule types, or several drum magazines and an associated crimping device are provided for one cable cross section, which have a common drive that can be selectively brought into operative engagement with one of the crimping devices. Such a solution requires a high level of technical equipment, since a large number of crimping devices has to be provided and driven.

DE 10 2015 119 217 A1, which stems from the Applicant, shows a crimping machine that eliminates the aforementioned disadvantages. This crimping machine has a storage arrangement with several drum magazines, each of which is assigned a common transport unit and a common, preferably central, crimp head so that the amount of equipment required is significantly reduced compared to the solution described above.

DE 10 2015 102 060 A1, which also stems from the Applicant, shows a crimping machine in which different ferrules are kept in a storage arrangement with several drum magazines. Each of these drum magazines has an associated transport unit via which the respective pre-selected ferrule is transported to a transfer position. The ferrule separated there is then guided to a common crimp head by a supply device or the like.

This crimping machine is characterized by high productivity. However, a certain disadvantage is seen in the fact that the required supply device is comparatively complex in design and takes up a corresponding amount of installation space, and that stripping is not possible.

In DE 10 2017 118 968, published by the Applicant after the priority date of this application, a crimping machine is disclosed in which a contact element to be crimped is guided directly into the working area of a crimp head without the interposition of a supply device or the like. In this known solution, the contact elements are preferably stored in drum magazines, so that the crimping machine has to be correspondingly designed with a separation device. Processing of separated contact elements is not possible or only possible to a limited extent.

U.S. Pat. No. 5,511,307 discloses a crimping machine with two adjacent feeding bowls with a respective vibration unit.

In contrast, the disclosure is based on the object of creating a machine suitable for stripping (removing insulation) and crimping, which enables flexible production with a comparatively simple design. In particular, the flexibility is to be increased and the technical equipment requirements is to be reduced.

This object is solved by a crimping machine with the features of the independent claim.

Advantageous further developments of the disclosure are the subject matter of the dependent claims.

The crimping machine according to the disclosure is used to crimp contact elements with an end section of a conductor, for example a cable end. The crimping machine has a storage arrangement for separated contact elements and a device for transporting the contact element. The crimping machine furthermore has, advantageously, a centering device for positioning the conductor end section with respect to a crimp head, via which the contact element is crimped to the cable end section. The components of the crimping machine are driven by a control unit.

According to the disclosure, the storage arrangement has a plurality of feeding bowls, in which different contact elements, for example ferrules, are included. These feeding bowls are configured with a vibration drive, wherein a common vibration drive is assigned to several feeding bowls. The feeding bowls, in particular their vibration drive, are driven by the control unit, so that selectively one of the feeding bowls conveys.

In an example, all feeding bowls are designed with the common vibration drive. This minimizes the technical equipment requirements of the crimping machine.

In a further development of the disclosure, more than two feeding bowls are provided. This increases the flexibility of the crimping machine.

The feeding bowls and the common vibration drive are coupled to a square and/or plate-shaped rest surface, for example a cover wall or cover surface.

Preferably, the feeding bowls are located on a top side of the cover surface, while the common vibration drive is located on a bottom side of the cover surface.

The common vibration drive can indirectly vibrate the feeding bowls via the cover surface.

The feeding bowls can be mounted variably (e.g. one above the other or next to each other) on the top of the cover surface in order to produce different crimping machines according to the invention with several identical parts.

The Applicant reserves the right to base an independent patent claim on the arrangement of at least two feeding bowls on a common cover surface, platform or the like of a vibration drive.

In an example, the feeding bowls are arranged in a horizontal plane next to each other or adjacent to each other. They can be arranged in a line next to each other or according to a pattern, for example V shaped or W shaped.

Alternatively, the feeding bowls can also be offset in the vertical direction, e.g. arranged one above the other, preferably in a stack.

The feeding bowls can be mounted on a holder so that they are spaced apart from each other. Alternatively, direct stacking is also provided.

Loading the feeding bowls is particularly easy if this holder has a pivot device for swinging out at least one of the feeding bowls from the working position.

In the solution where the feeding bowls are arranged next to each other, they are preferably arranged on a common pitch circle or two or more pitch circles, wherein transport units/feeding devices are arranged centrally.

In an example, five or more, for example seven, feeding bowls are provided. These can be assigned to cable cross sections of 0.34 mm, 0.50 mm, 0.75 mm, 1.00 mm, 1.50 mm, 2.50 mm or 4.00 mm. Other cross-sections can of course also be processed.

In one example, all feeding bowls convey into a common feed, through which the contact elements are conveyed to the crimp head.

BRIEF DESCRIPTION OF THE DRAWINGS

The disclosure is explained in more detail below using schematic drawings. These show.

DESCRIPTION

Figure 1:
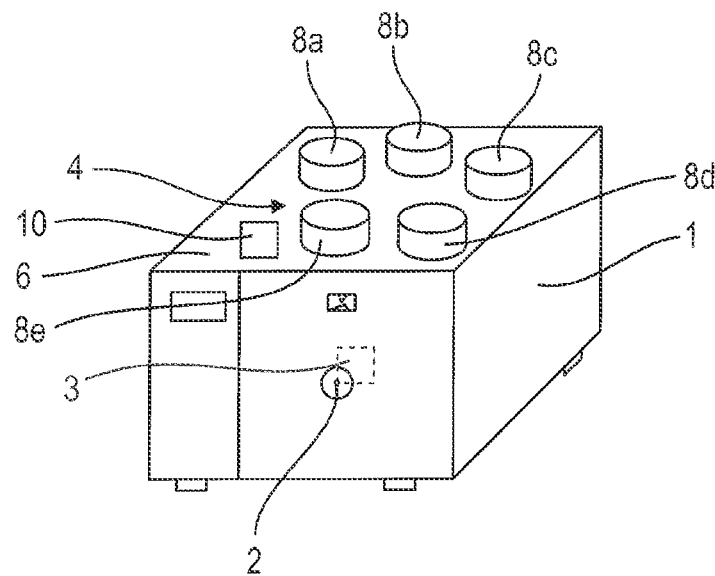
FIG. 1 shows a schematic representation of an embodiment with feeding bowls arranged next to each other.

FIG. 1 shows a crimping machine 1, the basic design of which is disclosed in aforementioned, post-published DE 10 2017 118 968, so that for details it is referred to the relevant explanations in there. Such a crimping machine 1 has at least one centering and guiding device 2, via which the cable ends to be processed can be fed. The contact elements to be crimped with the cable ends, preferably ferrules, are accommodated in a storage arrangement 4, which is arranged, for example, on a plate-shaped rest surface, hereinafter referred to as cover surface 6, of a housing of the crimping machine 1. The actual crimp head 3 is provided in this housing and is used to crimp the cable end to the ferrule.

According to the disclosure, the storage arrangement 4 is designed with several, or example with five or more, feeding bowls 8.

In the example shown in FIG. 1, the storage arrangement 4 is designed with five feeding bowls 8 arranged on a horizontal plane (in this example the rest surface/cover surface 6 of the housing), in which different types of ferrules are accommodated. The feeding bowls 8a to 8e are designed as vibration feeding bowls in the embodiment shown, to which a common vibration drive 10 is assigned according to the invention. This is only exemplarily arranged in FIG. 1—the position is chosen in such a way that an optimal operational connection with the feeding bowls 8 is achieved.

In the embodiment shown, the feeding bowls 8 are arranged on a common pitch circle. Alternatively, the feeding bowls 8 can also be positioned on one axis next to each other or according to a geometric pattern (see FIG. 7). However, the positioning is carried out in such a way that the outputs of the respective feeding bowls, hereinafter referred to as feeding devices, end in a common conveyor section/conveyor system, hereinafter referred to as feed 20, or are in operational connection with it, so that these fed, separated ferrules can be guided to the crimp head 3.

The feeding bowls 8 can also be arranged in several offset planes, so that for example three feeding bowls 8 are arranged in a first plane and two feeding bowls 8 in a second plane, each of which is assigned a vibration drive or a common vibration drive.

Figure 2:
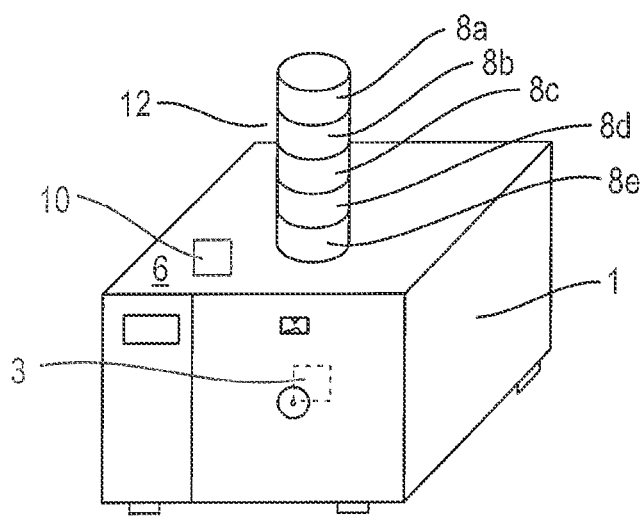
FIG. 2 shows a variant with feeding bowls arranged in a stack.

FIG. 2 shows a variant of the crimping machine 1 according to the disclosure, in which the feeding bowls 8a to 8e are not arranged in a horizontal plane but as a stack 12, which in turn is arranged on the cover surface 6 of the crimping machine 1. This stack 12 also has a common vibration drive 10 assigned to it, which is preferably arranged in the axis of the stack 12.

Figure 3:
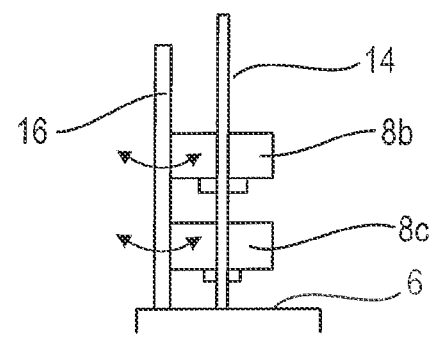
FIG. 3 shows a further development of the concept according to FIG. 2, wherein the feeding bowls are mounted such that they can be swung out.

For easier access to the feeding bowls 8b to 8e within the stack, they can be mounted on a central holder 14 at a distance from each other or vertically adjustable as shown in FIG. 3. The holder 14 is in turn supported by the cover surface 6, which can be designed as a comparatively solid base plate for all examples.

In the example shown in FIG. 3, the feeding bowls 8b, 8c shown as an example can be swung out of the central stack position via a pivot device 16, thus simplifying loading. It is preferred if individual feeding bowls 8a to 8e can be swung out. However, basically it may also be sufficient to swing out the entire stack 12 and then load the feeding bowls 8.

Figure 4:
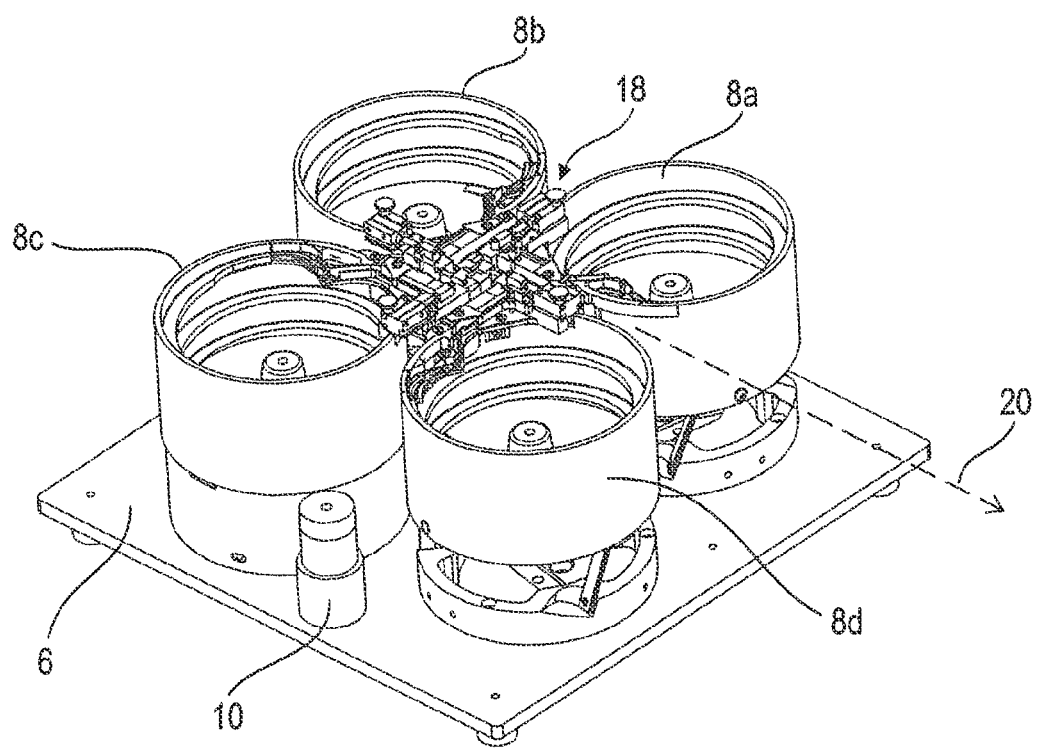
FIG. 4 shows a concrete embodiment of an arrangement with feeding bowls arranged next to each other.

FIG. 4 shows a concrete design of the example as shown in FIG. 1. In this variant, four feeding bowls 8a to 8d are mounted on the plate-shaped cover surface 6 and can be vibrated via a common vibration drive 10. The separated ferrules are then led from a feeding bowl outlet to a common separation device 18 and then conveyed to the crimp head 3 via a feed 20 indicated in a dashed line. This feed 20 is shown schematically while conveying to the right (view FIG. 4). The feed direction depends on the type of crimping machine 1. For example, it can be advantageous if the feed 20 conveys from the level of the separation devices 18 downwards. The feed 20 is then common to all feeding bowls 8. Details of a feed 20 are described in the patent application DE 10 2017 102 618 published after the priority date of this application—regarding further details, it is referred to this application of the Applicant.

Figure 5:
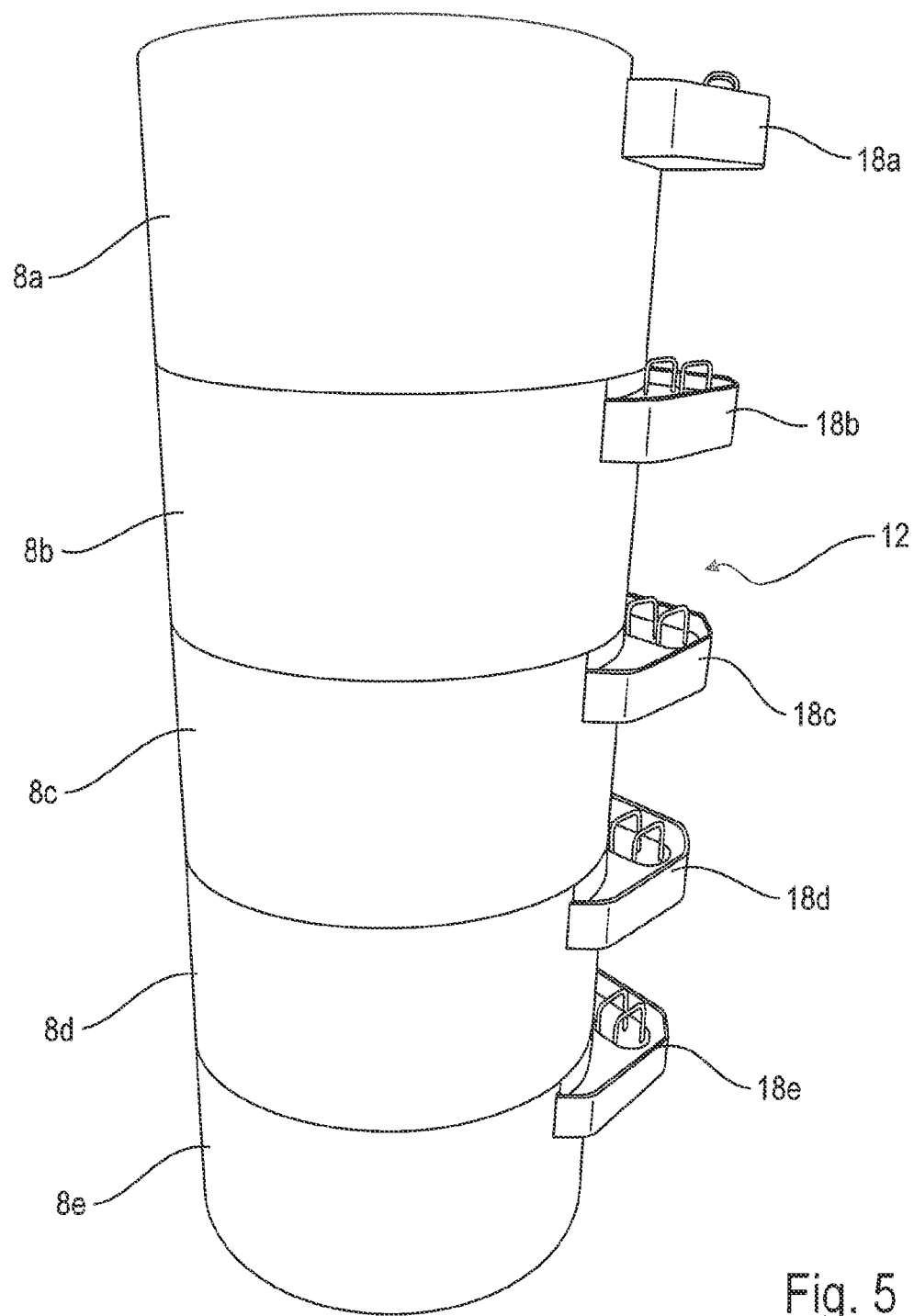
FIG. 5 shows a feeding bowl stack in a first version.

FIG. 5 shows a schematic stack arrangement in which five feeding bowls 8a to 8e are coaxially arranged directly above each other in the stack 12. The separation devices 18a to 18e, of which only some details are shown, are also arranged in the variant according to FIG. 5 in the axial direction of the stack 12, wherein they preferably end in the common feed (not shown).

Figure 6:
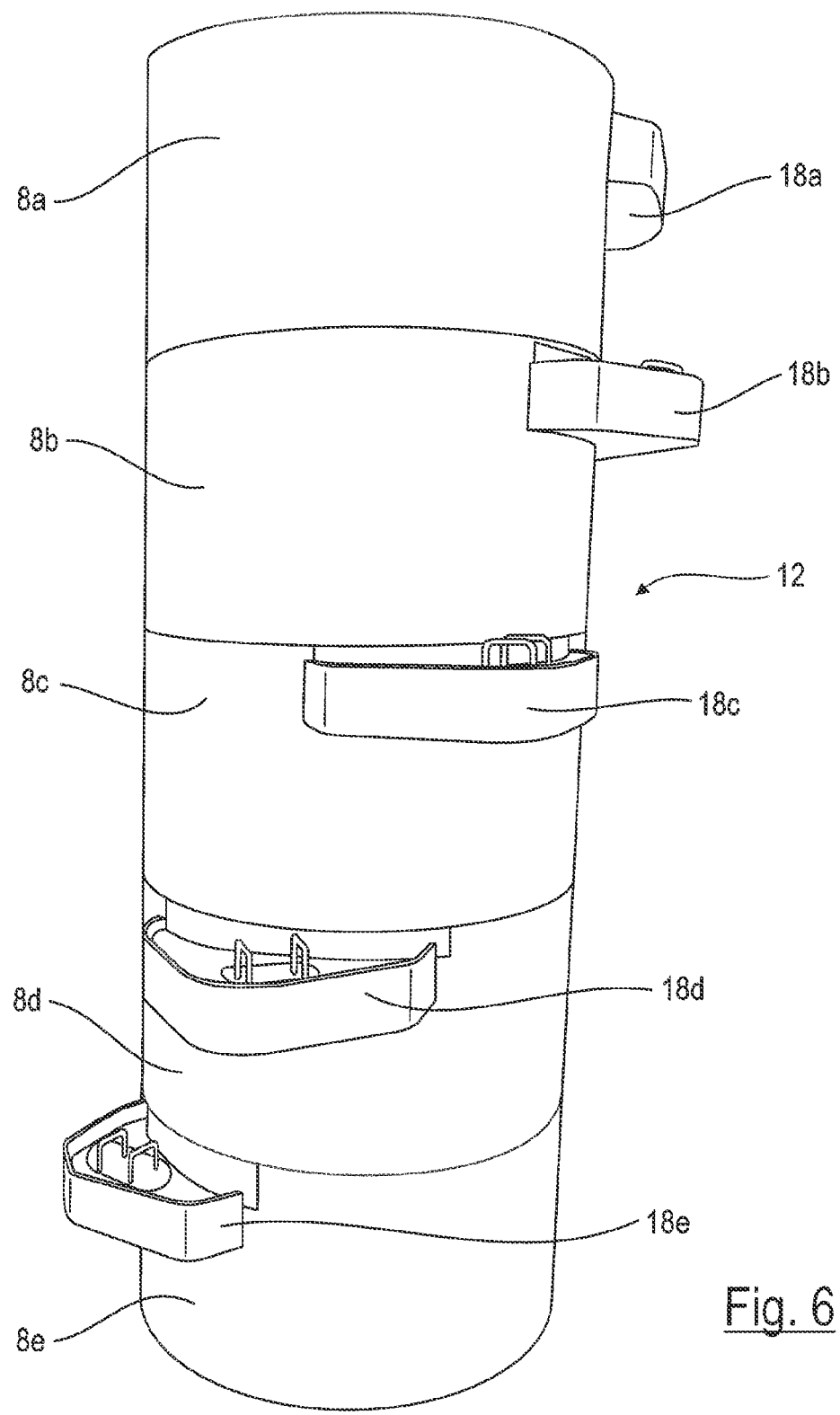
FIG. 6 shows a feeding bowl stack in a second version.

FIG. 6 shows a variant of the stack 12 in which the separation devices 18a to 18e are arranged offset to each other in the circumferential direction, so that they lie on a spiral line in the representation according to FIG. 6.

Figure 7:
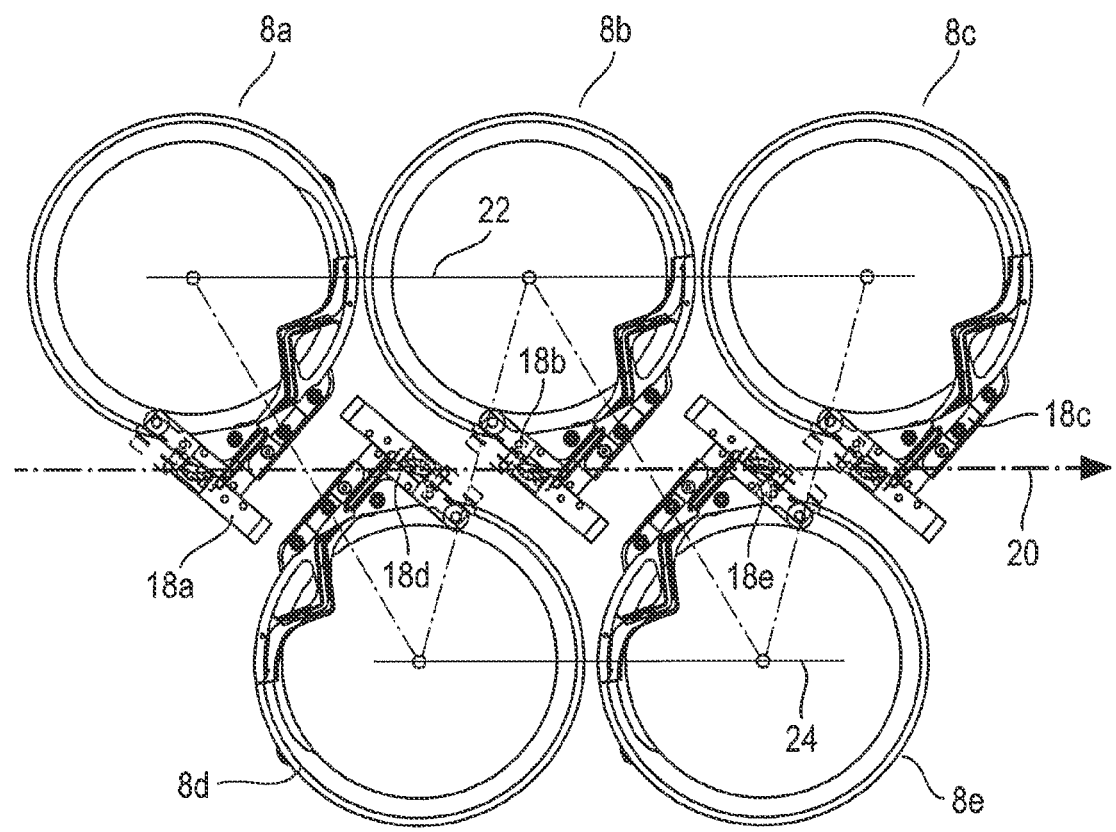
FIG. 7 shows an embodiment with feeding bowls arranged in a W shape.
Figure 8:
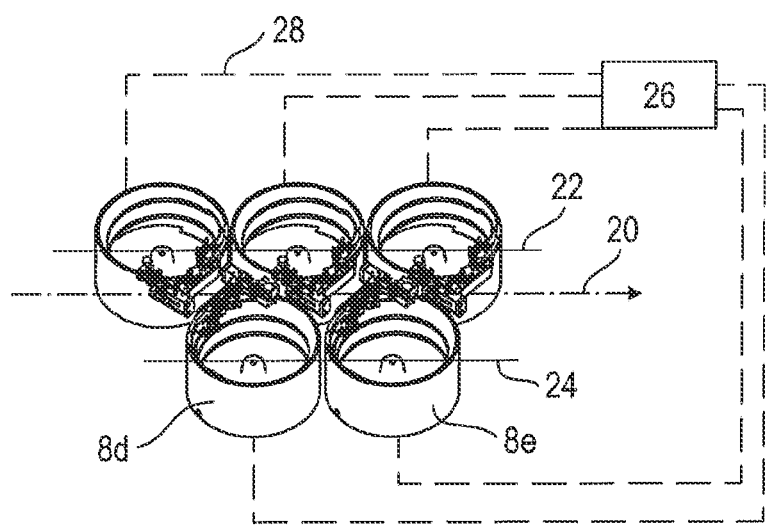
FIG. 8 shows a three-dimensional representation of the embodiment according to FIG. 7.

FIGS. 7 and 8 show another example, where five feeding bowls 8a, 8b, 8c, 8d and 8e are arranged in a roughly W-shaped pattern (see dashed dotted line in FIG. 7). The three feeding bowls 8a, 8b, 8c are arranged side by side on a straight line 22. The other two feeding bowls 8d, 8e are arranged on a parallel straight line 24.

The separation devices 18a, 18b, 18c, 18d and 18e assigned to the feeding bowls 8a to 8e are oriented towards the common feed 20, through which the respective ferrules are fed to the crimp head 3. In the embodiment shown in FIGS. 7 and 8, the feed 20 runs at least in the area of the separation devices 18a to 18d at the same parallel distance from the straight lines 22 and 24—in other words, the feed 20 runs in sections approximately centrally between the two feeding bowl rows 8a, 8b, 8c, 8d, 8e.

In the example according to FIGS. 7 and 8, the feeding bowls 8 are also designed as vibration feeding bowls, wherein for example all feeding bowls 8 have a common vibration drive 10, or for example the feeding bowls 8a, 8b, 8c or 8d, 8e lying on the straight lines 22, 24 each have a common vibration drive 10 (vibration conveyor).

The feeding bowls 8, in particular the vibration drives 10, are driven by a control unit 26 of the crimping machine 1, which transmits control signals to the vibration drives 10/feeding bowls 8 via signal lines 28 or a bus system.

A storage arrangement 4, designed according to the disclosure, enables an extremely compact design of the crimping machine 1, wherein the central control unit 26 enables automatic assembly of different cable and ferrule types.

A crimping machine with a storage arrangement is disclosed, which has a plurality of feeding bowls for separated contact elements.

LIST OF REFERENCE SIGNS 1 crimping machine
2 feeding device
3 crimp head
4 storage arrangement
6 cover surface
8 feeding bowl
10 vibration drive
12 stack
14 holder
16 pivot device
18 separation device
20 feed
22 straight line
24 straight line
26 control unit
28 signal line

What is claimed is:

1. A crimping machine, comprising:
a storage arrangement for separated contact elements;
a device for transporting the separated contact elements to a crimp head; and
a centering device for positioning a conductor end section with respect to the crimp head;
wherein:
the storage arrangement has three or more feeding bowls, each of the three or more feeding bowls comprising a respective separation device;
the three or more feeding bowls convey, via the respective separation devices of the three or more feeding bowls, into a single, common conveyor, through which all elements are conveyed to the crimp head;
the respective separation devices of the three or more feeding bowls end in a single, common conveyor section of the single common conveyor so that the elements are guided from the respective separation devices of the three or more feeding bowls to the crimp head;
at least two of the three or more feeding bowls are designed with a common vibration drive and can be driven via a common control unit; and
the crimping machine is configured for crimping contact elements with the conductor end section, wherein the common vibration drive is a single vibration drive shared by and operable to vibrate each of the at least two feeding bowls designed with the common vibration drive.

2. The crimping machine according to claim 1, wherein: the three or more feeding bowls are configured with the common vibration drive, such that the common vibration drive is shared by and operable to vibrate all of the three or more feeding bowls.

3. The crimping machine according to claim 1, wherein all of the three or more feeding bowls and the common vibration drive are coupled to a cover surface of a housing of the crimping machine, such that the common vibration drive is shared by and operable to vibrate all of the three or more feeding bowls.

4. The crimping machine according to claim 1, wherein the feeding bowls are arranged side by side in a horizontal plane.

5. The crimping machine according to claim 4, wherein the feeding bowls are arranged on a common pitch circle or according to a V-shaped or W-shaped pattern.

6. The crimping machine according to claim 1, wherein the feeding bowls are arranged one above another.

7. The crimping machine according to claim 6, wherein the feeding bowls are accommodated on a holder at a distance from each other.

8. The crimping machine according to claim 6, including a pivot device for swinging out at least one of the feeding bowls from a working position, wherein the pivot device is a vertical structure to which one side of the at least one feeding bowl is mounted and around which the at least one feeding bowl can be pivoted.

9. The crimping machine according to claim 1, wherein five or more feeding bowls are provided.

10. The crimping machine according to claim 1, wherein the contact elements crimped by the crimping machine are ferrules.

11. The crimping machine according to claim 1, wherein the end section of the conductor with which the contact elements are crimped by the crimping machine is a cable end.

12. The crimping machine of claim 1, wherein the feeding bowls and the common vibration drive are coupled to a plate-shaped rest surface.

13. The crimping machine according to claim 7 wherein the distance along the holder is adjustable.

* * * * *